United States Patent
Theodore et al.

(10) Patent No.: US 10,562,801 B2
(45) Date of Patent: Feb. 18, 2020

(54) REDOX WATER TREATMENT METHOD

(71) Applicants: Marcus George Theodore, Salt Lake City, UT (US); Terry R Gong, Moraga, CA (US)

(72) Inventors: Marcus George Theodore, Salt Lake City, UT (US); Terry R Gong, Moraga, CA (US)

(73) Assignee: Earth Renaissance Technologies, LLC, Salt Lake City, UT (US)

( * ) Notice: Subject to any disclaimer, the term of this patent is extended or adjusted under 35 U.S.C. 154(b) by 260 days.

(21) Appl. No.: 15/484,963

(22) Filed: Apr. 11, 2017

(65) Prior Publication Data
US 2017/0217803 A1    Aug. 3, 2017

Related U.S. Application Data

(63) Continuation-in-part of application No. 14/513,773, filed on Oct. 14, 2014, now abandoned, which is a
(Continued)

(51) Int. Cl.
*C02F 3/30*    (2006.01)
*C02F 1/70*    (2006.01)
(Continued)

(52) U.S. Cl.
CPC .............. *C02F 3/302* (2013.01); *C02F 1/66* (2013.01); *C02F 1/70* (2013.01); *C02F 1/72* (2013.01); *C02F 1/722* (2013.01); *C02F 1/74* (2013.01); *C02F 1/5236* (2013.01); *C02F 2101/20* (2013.01); *C02F 2209/04* (2013.01); *C02F 2209/05* (2013.01); *C02F 2209/22* (2013.01)

(58) Field of Classification Search
CPC ........ C02F 1/66; C02F 1/722; C02F 2101/20; C02F 11/14; C02F 1/70; C02F 3/302
USPC .......................... 210/631, 724, 614, 758, 757
See application file for complete search history.

(56) References Cited

U.S. PATENT DOCUMENTS

| | | | |
|---|---|---|---|
| 7,416,668 | B1 | 8/2008 | Theodore |
| 7,429,329 | B2 | 9/2008 | Theodore et al. |
| | | (Continued) | |

OTHER PUBLICATIONS

Arthur A. Noyes, Harold H. Steinour, Potential of Inert Electrodes in Solutions of Sulfurous Acid and its Behavior as an Oxidizing and Reducing Agen, J.Am.Chem.Soc. 1929.
(Continued)

*Primary Examiner* — Claire A Norris
(74) *Attorney, Agent, or Firm* — Marcus G. Theodore

(57) ABSTRACT

A redox water treatment method comprises first determining the composition of water and whether water treatment requires either oxidation or reduction, or both to optimize nitrogen removal by a bioreactor. Sulfur dioxide ($SO_2$) is injected into the water to be treated to provide $H^+$, $SO_2$, $SO_3^=$, $HSO_3^-$, dithionous acid ($H_2S_2O_4$), and other sulfur intermediate reduction products forming a sulfur dioxide treated water, which behaves either as a reducing agent or an oxidizing agent depending on the strength of the acid concentration, which alters sulfurous acid from a reducing agent to a more powerful oxidizing agent.

23 Claims, 2 Drawing Sheets

Related U.S. Application Data continuation-in-part of application No. 13/373,169, filed on Nov. 7, 2011, now abandoned.

(51) Int. Cl.
   *C02F 1/66* (2006.01)
   *C02F 1/72* (2006.01)
   *C02F 1/74* (2006.01)
   C02F 101/20 (2006.01)
   C02F 1/52 (2006.01)

(56) References Cited

U.S. PATENT DOCUMENTS

| | | | |
|---|---|---|---|
| 7,455,773 B1 | 11/2008 | Harmon et al. | |
| 7,563,372 B1 | 7/2009 | Theodore | |
| 7,566,400 B2 | 7/2009 | Harmon et al. | |
| 7,867,398 B2 | 1/2011 | Harmon et al. | |
| 7,967,989 B2 | 1/2011 | Gong et al. | |
| 2009/0294354 A1* | 12/2009 | Theodore | A01G 33/00 210/602 |
| 2010/0018921 A1 | 1/2010 | Ruehr et al. | |
| 2010/0193429 A1* | 8/2010 | Harmon | C02F 9/00 210/609 |
| 2011/0247985 A1* | 10/2011 | Theodore | C02F 1/66 210/720 |

OTHER PUBLICATIONS

Rouette, Hans-Karl (2001) Encyclopedia of Textile Finishing, Woodhead Publishing ("Reducing Agents").

Bhanu Prakash Vellanki et al, "Advanced Reduction Processes: A New Class of Treatment Processes", Environ Eng Sci. May 2017; 30(5): 264-271.

* cited by examiner

REDOX WATER TREATMENT METHOD

CROSS-REFERENCE TO RELATED APPLICATIONS

This application is a continuation-in-part patent application of Ser. No. 14/513,773 entitled "Redox Water Treatment Method" filed Dec. 30, 2014, which is a continuation-in-part of Ser. No. 13/373,169 filed Nov. 7, 2011 entitled "Redox Water Treatment Method."

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Field of the Invention

This invention pertains to redox water treatment methods. In particular it pertains to a redox water treatment method utilizing sulfurous acid to act either as an oxidizing or a reducing solution for water conditioning.

State of the Art

Numerous water treatment methods using sulfurous acid are known. Harmon et al, U.S. Pat. No. 7,566,400 issued Jul. 28, 2009 discloses a wastewater chemical/biological treatment method and apparatus for saline wastewater treatment generating biofuels. Harmon et al, U.S. Pat. No. 7,455,773 issued Nov. 25, 2008 discloses a package wastewater chemical/biological treatment plant recovery apparatus and method including soil SAR conditioning. Theodore, U.S. Pat. No. 7,416,668 issued Aug. 26, 2008 discloses a wastewater chemical/biological treatment plant recovery apparatus and method employing sulfurous acid disinfection of wastewater for subsequent biological treatment. Theodore, U.S. Pat. No. 7,563,372 issued Jul. 21, 2009 discloses a package dewatering wastewater treatment system and method including chemical/mechanical separation via drain bags and metal hydroxide removal via lime precipitation. Theodore, U.S. Pat. No. 7,429,329 issued Sep. 30, 2008 discloses a hybrid chemical/mechanical dewatering method and apparatus for sewage treatment plants employing sulfurous acid and alkalinization chemical treatment along with mechanical separation. Theodore et al, U.S. Pat. No. 7,967,990 issued Jun. 28, 2011 discloses a hybrid chemical/mechanical dewatering method for inactivating and removing pharmaceuticals and other contaminants from wastewater employing a sulfurous hybrid chemical/mechanical dewatering method for inactivating and removing pharmaceuticals and other contaminants from wastewater employing a sulfurous acid and lime acidification/alkalinization cycle, and an oxidation/reduction cycle to selectively precipitate, inactivate, and remove pharmaceuticals from wastewater. Gong et al., U.S. Pat. No. 7,967,989 issued Jun. 28, 2011 discloses a groundwater recharging wastewater disposal method and apparatus using sulfurous acid acidification to enhance soil aquifer treatment. Harmon et al., U.S. Pat. No. 7,867,398 issued Jan. 11, 2011 discloses a method and apparatus to reduce wastewater treatment plant footprints and costs by employing vacuum recovery of surplus sulfur dioxide, Theodore (US20080314827) (Theodore '827) adds an oxidizing agent to oxidize chemical species before sulfur dioxide injection. It does not alter the states of the sulfur dioxide itself. Nor does Theodore '827 disclose continuous ORP and DO monitoring of acidified wastewater biological solutions to control and alter their ORP and DO to form oxic and anoxic solutions to promote biological growth in a biological reactor for nitrogen reduction.

FRWA's Training (Method of Controlling Nitrogen) (FRWA) FRWA discloses monitoring of ORP levels, but it does not disclose controlling and solely using sulfurous acid to produce oxidation and reduction solutions conducive to promote bacterial growth in a bioreactor.

The above methods all use sulfurous acid and are therefore dependent upon the sulfur dioxide, sulfite, and bisulfite concentrations in solution and the oxidation/reduction potential of a desired reaction. Sulfurous acid behaves as both an oxidizing and reducing agent, see J. Am. Chem. Soc., 1929, 51 (5) pp 1409-1428, "The Potential of Inert Electrodes in Solutions of Sulfurous Acid and Its Behavior as an Oxidizing and Reducing Agent" by Arthur A. Noyes, Harold H. Steinour. Consequently, where the waters to be treated vary in nutrient composition, alkaline and saline ionic concentrations, or require biological treatment requiring either a pre-treatment conditioning reducing agent or oxidizing agent, there remains a need for a method to regulate the electrical reduction potential of the sulfurous acid solutions. The method described below provides such a pre-treatment method.

BRIEF SUMMARY OF THE INVENTION

A redox water treatment method comprises first determining water nutrient composition and whether water treatment requires either oxidation or reduction, or both. The sulfur dioxide ($SO_2$) is injected into water to be treated to provide $H^+$, $SO_2$, $SO_3^=$, $HSO_3^-$, dithionous acid ($H_2S_2O_4$), and other sulfur intermediate reduction products forming a sulfur dioxide treated water, which behaves either as a reducing agent or an oxidizing agent depending on the application required for the combination acted upon and the strength of the acid. An increase in acid concentration makes sulfurous acid a less powerful reducing agent, and a more powerful oxidizing agent.

DETAILED DESCRIPTION OF THE INVENTION

The present invention comprises a redox water treatment method employing sulfurous acid. It comprises first determining the water's composition and whether water treatment requires either oxidation or reduction, or both. Next, sulfur dioxide ($SO_2$) is injected into water to be treated to provide $H^+$, $SO_2$, $SO_3^=$, $HSO_3^-$, dithionous acid ($H_2S_2O_4$), and other sulfur intermediate reduction products forming a sulfur dioxide treated water. These species as discussed by Noyes and Steinour may be affected by the presence of other ions in solution, but in general, the acidic sulfur compounds reduce to a lower oxidation state in accordance with the reaction:

$$3HSO_3^- = SO_4^= + S_2O_4^= + H^+ + H_2O - 4660 \text{ cal.} \quad (4)$$

The sulfurous acid and dithionous acid electro-motivate the electrode potential so the actual electrode reaction is $$S_2O_4^= + 2H_2O = 2H^+ + 2HSO_3^- + 2E^- + 415 \text{ cal or} \quad (5)$$

$$S_2O_4^= = 2SO_2(g) + 2E^- + 5015 \text{ cal} \quad (6)$$

The dithionous acid decomposes in the presence of large hydrogen ion concentrations according to the equation:

$$2S_2O_4^= + H^+ + H_2O = S + 3HSO_3^- + 46,590 \text{ cal} \quad (7)$$

Sulfur rapidly unites with sulfurous acid to form thiosulfuric acid, but until it has significant concentration, the dithionous acid decomposes in accordance with the equation:

$$2S_2O_4^= + H_2O = S_2O_3^= + 2HSO_3^- + 44,015 \text{ cal} \quad (8)$$

The free-energy values show that Reactions 4, 7 and 9 tend to take place in the direction in which they are written (when the other ion concentrations are 1 molal). At 1 molal, the $S_2O_4^=$ has the following values:

Reaction 4, when it is less than 0.0004 molal.
Reaction 7, when it is greater than 10-17 molal.
Reaction 8, when it is greater than 10-16 molal.

Thus, sulfurous acid behaves either as a reducing agent or an oxidizing agent depending on the nature of the combination acted upon and the strength of the acid. Further, at a given acid concentration the reduction potential of the combination acted upon need only be varied by a relatively small amount (20 to 40 mv.) in order to change the action of sulfurous acid from a reducing agent to an oxidizing agent. An increase in acid concentration makes sulfurous acid a less powerful reducing agent, and also a more powerful oxidizing agent.

The waters composition and oxidation reduction potential is continuously monitored, and if a reducing solution is required for water treatment, the sulfur dioxide is injected into the water without the addition of additional acid. If an oxidizing solution is required, the sulfur dioxide is injected with air, an oxidizing agent, such as hydrogen peroxide, ferric or ferrous compounds and the pH lowered to provide an oxidizing solution. Oxidation may also require the addition of additional acid. The type of additional acid is selected so that the cations added do not adversely affect the composition of the resultant treated water. For example, sulfurous acid is preferable to hydrochloric acid as the monovalent chlorides adversely affect the salinity of the water when applied to soils, whereas the bivalent sulfates do not.

If both reduction and oxidization is required for water treatment, first the sulfur dioxide is added to the water to create a reducing solution and held for the dwell time for the reduction mechanisms to effectively reduce the compounds of interest. Next an oxidizing agent (such as air for ease in handling and availability) and acid are added to the sulfurous acid solution to form an oxidizing solution to oxidize the compounds of interest. The sulfurous acid treated waters are then pH adjusted to a level required by the end user, and to precipitate any heavy metals contained therein for filtration removal. Lime has the advantage of elevating the pH, precipitating heavy metals as metal hydroxides for filtration removal and providing calcium to adjust the sodium adsorption ratio (SAR) when required for soil treatment. Other alkaline compounds, such as ammonia, may be used when additional nitrogen nutrients are required.

With complex waters, such as wastewater, numerous other molecular compounds and components are present. Therefore the amount of sulfurous acid and pH adjustment required must be determined in the field by trial and error as bicarbonates, and other compounds materially affect the amount of sulfur dioxide and acid required for oxidation and reduction. However, the initial estimates of the amount of sulfurous acid may be based on laboratory studies of pure solutions, such as the Noyes and Steinour studies, which found:

" . . . Sulfur dioxide at 25° at 1 atm. In an aqueous solution containing hydrogen ion at 1 molal may be expected to behave toward other oxidation-reduction combinations of substances in three different ways according as the reduction potential of the latter (a) is more negative than −0.37 volt; (b) lies between −0.37 and −0.14 volt; and (c) is more positive than −0.14 volt. (It may be recalled that the value −0.37 is the potential which sulfur dioxide has, under the specified conditions, with respect to its conversion into dithionite ion $S_2O_4^=$ as it exists in the steady reaction state, and that −0.14 is the potential which it has with respect to its conversion to sulfate ion, $SO_4^=$, at 1 molal.) For it is evident that sulfur dioxide may oxidize any combination with a reduction potential more reducing (less negative) than −0.37 volt, and that it may reduce any combination which has a potential more oxidizing (more negative) than −0.14 volt. Therefore it may either oxidize or reduce any combination with a potential between −0.37 and −0.14 volt, and which of these two possible effects actually occurs will depend on the relative rates of the oxidizing reaction and the reducing reaction."

Thus, after determining the water's composition and whether water treatment requires either an oxidizing or reducing solution, or both, sulfur dioxide ($SO_2$) with minimal oxygen or oxygen containing compounds is injected into the water to create a reducing solution in one mode, or sufficient oxygen or oxygen containing compounds into the sulfur dioxide treated water to create an oxidizing solution in another mode.

The acid pH concentration is similarly adjusted to either insure the electrical conductivity level of the sulfur dioxide treated water is sufficient for release of electrons from the sulfur dioxide, sulfites, bisulfites, and dithionous acid to form a reducing solution to:

i. reduce oxidants and compounds,
ii. disinfect pathogens,
iii. acid leach heavy metals from suspended solid into solution, or
iv. Self-agglomerate suspended solids.

Alternatively, the acid concentration is increased in the presence of oxygen or oxygen containing compounds sufficiently to accept electrons when the sulfurous acid treated water acts as an oxidizing solution.

Where self-agglomerating suspended solids are present, they are removed and disposed of after sulfur dioxide treatment along with any adsorbed polar molecules to produce a filtrate containing heavy metals. Conditioning of these solids is defined as treating the solids with sufficient $SO_2$ allowing them chemically to self-adhere to aid in their separation and removal from filtration screens or membranes, but at a level not affecting the permeation characteristics of a filter or membrane. Based on field tests at the Montalvo Municipal Improvement District wastewater treatment plant, self-agglomeration occurs at a pH of approximately 3 to 6.5 resulting in fine suspended solids, which drop to the bottom of percolation ponds, leaving a clear effluent where the bottom can be seen at a depth of 7 to 8 feet as opposed to 2 feet with no acid treatment. These separated conditioned solids chemically dewater upon draining to a water content of less than 10.

The pH of the filtrate is then raised with an alkaline reagent, such as lime to precipitate heavy metals for removal as metal hydroxides. After removal, a disinfected demetalized filtrate results suitable for raising crops or biological treatment.

The electrical conductivity varies based on the composition of the waters to be treated, but is between −0.37 and −0.14 volt at 25° C. at 1 molal $H^+$ for culinary waters. This is continually monitored using various meters, such as ORP meters, to determine when conditions change from an oxidizing to a reducing solution.

Preferably, the sulfur dioxide gas is generated by oxidation of elemental sulfur for injection and capture into an aqueous solution via water scrubbing of a stream of either treated or untreated wastewater to form sulfurous acid ($H_2SO_3$). When used to pre-treat and disinfect wastewater, $SO_2$ conditioning generally results in a color change of the solids from a dark brown to a lighter gray brown color. Similarly, the $SO_2$ treated liquids generally change from a greenish color to a lighter gray brown colloidal suspension color. The malodorous smell of the raw wastewater is replaced by a slight acidic smell. Consequently, the conditioning point for the wastewater can easily be determined by injecting more and more $SO_2$ into the wastewater until the color and odor changes occur usually observed at a pH of approximately between 1.5 and 3.

The basic acid disassociation chemical reactions of $SO_2$ in water are:

$$SO_2 + H_2O \leftrightarrow H_2SO_3 \text{ sulfurous acid}$$

$$H_2SO_3H \leftrightarrow H^+ + HSO_3^- \text{ bisulfite pK=1.77}$$

$$HSO_3^- \leftrightarrow H^+ + SO_3^= \text{ sulfite pK=7.20}$$

This means 50% of the $SO_2$ is gas at pH 1.77 and 50% is $HSO_3^-$. In a similar manner, 50% is $HSO_3^-$ and 50% is $SO_3^=$ at pH 7.2. Halfway between pH 7.2 and 1.77 is 5.43 as the pH where all of the sulfur exists as the $HSO_3^-$ form. At a pH of 10.86, all of the sulfur should exist as $SO_3^=$.

Making an aqueous solution, too acidic (pH 0) will result in an excess of $SO_2$ gas in solution. This will be the point of maximum biocidal activity. However, this will mean the $SO_2$ gas will vent out of solution exposing the operator to $SO_2$ without adequate precautions. This can be avoided at the point of about pH 5.43 where dominantly $HSO_3^-$ will exist. The pH acid level is thus selected and monitored to ensure the concentration of the $SO_2$ and sulfite species are sufficient to provide the level of reductants required, and the acid will not adversely affect the health of operators or damage handling equipment, while elevating the sulfite concentrations. As discussed below, at a pH approximately 7 there are sufficient sulfites and bisulfites for denitrification.

Use of sulfurous acid for water disinfection avoids the need for chlorine gas, bleach (active hypochlorous acid HOCl), hydrogen peroxide ($H_2O_2$) or ozone ($O_3$) to prevent the formation of biofilms.

Where the $SO_2$ treated waters are land applied as soil amendments, it may require further adjustment to meet the following:

a. SAR. The Sodium Adsorption Ratio (SAR) indicates the relative activity of sodium ions as they react with clay. The SAR is a property of the water phase. The SAR determines the relative hazard caused by applying water having a high SAR to soil. When the SAR is high (>15), more of the sodium ($Na^+$) ions in the solution phase will become adsorbed onto the solid phase (clay minerals and humus) of the soil. This solid phase of clay minerals and humus contains a net negative electrical charge and is termed the soil Cation Exchange Capacity (CEC). As more sodium ions are adsorbed to the solid phase, the soil aggregates composed of large conglomerations of sand, silt, clay and humus particles become destabilized. This condition is termed dispersion, disaggregation or deflocculation. The result is the transformation of the aggregates into their individual sand, silt, clay and humus particles as opposed to the previously aggregated particles. The result of this transformation is the destruction of the soil's ability to transmit air, water and nutrients to plant roots. As these dispersed silt and clay particles move downward, they cover the previously existing soil pores and effectively block further water infiltration and penetration through the soil. Typically, SAR is adjusted with the addition of more calcium ions from salts, such as lime, spent lime, hydrated lime, gypsum, etc. adjustment.

b. MVCAR. Technically, the SAR should be expanded to include all monovalent cations. Thus, we also use the Mono-Valent Cation Adsorption Ratio (MVCAR), rather than simply the SAR as a measure of potential hazard of the liquid water phase solution. These monovalent cations normally present in water and soils include sodium ($Na^+$), potassium ($K^+$) and ammonium ($NH_4^+$) ions. Municipally treated waste water effluent often has an elevated level of sodium and of ammonium ions. Irrigation of a soil with this type of water (high MVCAR) can cause dispersion, disaggregation, or deflocculation of the soil particles and is usually off-set with similar calcium salt addition.

c. EC—to insure adequate water infiltration and water permeability through the soil, the Electrical Conductivity (EC) of irrigation water should be brought to greater than 0.3 ds/m or greater than 0.3 mmhos/cm. with the addition of soluble calcium. This prevents deflocculation or dispersion of the soil. When water has been treated to remove all of the major cations [namely, calcium ($Ca^{2+}$), magnesium ($Mg^{2+}$), sodium ($Na^+$), potassium ($K^+$) and ammonium ($NH_4^+$) ions], then another problem occurs. As the total salt concentration approaches zero (as occurs when the Electrical Conductivity EC of the water approaches zero), the soil will disperse easily. This condition occurs during Reverse Osmosis (RO) conditions applying pure filtrate for irrigation. The reason for this dispersion is the system must have a relative equilibrium of adsorbed (solid phase) cations and solution phase cations to maintain the stability of the soil aggregates.

The solution to the soil dispersion problem is first to know what the EC and SAR or MVCAR are for a specific water intended for use as irrigation or for use in water recharge of any underground aquifer. It has long been recognized a high SAR or MVCAR can cause this problem. However, the lower the EC of the water used for irrigation, the greater the soil dispersion hazard of using this water. Second, the only way to insure this problem will not manifest itself and prevent dispersion of the soil system is to add additional soluble calcium ($Ca^{2+}$) ions to the system (regardless of whether the cause is a high SAR or MVCAR or a very low EC in the liquid phase).

The added soluble calcium for this counter dispersion process is usually derived from either of two sources: Gypsum (calcium sulfate dihydrate) or calcium carbonate spent lime plus sulfur dioxide ($SO_2$) forming calcium sulfite reacting to form soluble calcium ions. Gypsum addition has the advantage of being pH neutral. Both generate soluble calcium ($Ca^{2+}$) ions in the solution phase, which are attracted to the solid phase CEC sites of the soil particles resulting in flocculation and aggregate stabilization. Failure to amend water applied to soil will result in the eventual destruction of the soil aggregates and cause dispersion, disaggregation and deflocculation.

This dispersion, disaggregation and defloculation hazard can occur under all conditions when the EC is very low (as occurs with rain water, snow melt water or RO treated water). Again, it is critical to increase the level of soluble calcium ($Ca^{2+}$) and acidity ($H^+$) ions when this very low EC condition occurs in water applied to soil. Irrigation with water having a high ammonium concentration (as occurs with ammonium fertilizer injected into irrigation water) or when municipally treated waste water is irrigated can also result in soil dispersion. Again, an adequate concentration of soluble calcium ions is used to prevent the dispersion, disaggregation or deflocculation of the soil system. The presence of magnesium ($Mg^{2+}$) ions is usually insufficient to correct this problem.

A high concentration of bicarbonate and/or carbonate can exacerbate the monovalent cation problem. When bicarbonate and/or carbonate are present, they react with the soluble calcium and magnesium converting these ions into insoluble calcium carbonate and magnesium carbonate. This process removes the required calcium ions from the solution phase. This magnifies the problem because the calcium concentration appears in the lower fraction of the SAR or the MVCAR formula. The result is the ratio becomes multiplied as a consequence of this precipitation of previously soluble calcium and magnesium ions. Hence, the SAR measurement is used to indicate how the retentates are monitored and adjusted to avoid either very low EC conditions or high SAR conditions.

d. pH. The pH of any soil system is also important to insure the pH is near a value of 6.5 (thereby reducing the problem of high bicarbonate and/or carbonate soil plugging) and insuring the presence of soluble calcium ions existing in the treated system. Failure to make a pH adjustment will cause precipitation of the calcium carbonate and magnesium carbonate. These insoluble carbonates will form inside the existing soil pores and will eventually plug these pores, thereby inhibiting the subsequent movement of water downward through the soil.

From the SAR, the proportion of sodium on the clay can be estimated when irrigation water has been used for a long period with reasonable irrigation practices. The SAR is a good index of the sodium permeability hazard if water passes through the soil and reaches equilibrium with it. From long experience, if the SAR is less than 3, there should be no problems with either sodium or permeability. In the range of 3 to 9, there are increasing problems. Above 9, severe problems can be expected.

A number of state and federal agencies have surveyed soils and preferred crop conditions throughout the United States. For example, the US Department of Agriculture Agricultural Research Service (USDAARS) base established various soil measurement guidelines. Its laboratory personnel have established criteria for diagnosing saline and sodic soils. Electrical conductivity (EC) of the soil saturation extract was introduced as a practical index of soil salinity. The threshold EC value of 4 dS/m is still used worldwide to diagnose and classify saline soils. A threshold of 15 for the exchangeable sodium percentage (ESP) defined as the ratio of sodium (Na) to the total cation exchange capacity [$ESP=((Na^+ \text{ cmol/kg})/(CEC \text{ cmol/kg}))*100$], indicates soil sodicity and permeability and structural problems.

Key practical diagnostic criteria used to evaluate a water's suitability for irrigation and its potential for degrading soils were developed at the USDAARS Salinity Laboratory. These include electrical conductivity (EC) mentioned above, sodium adsorption ratio (SAR), adjusted SAR and boron (B) hazard. Electrical conductivity is the universal standard measure of water salinity hazard. Sodium adsorption ratio is also a universal standard indicating water potential to cause sodic conditions and poor soil structure. Both of these indicators are critical for management decisions and together constitute the basis of a classification system for waters with respect to their salinity and sodicity hazard. Adjusted SAR was developed to correct the measure of sodium hazard for the tendency of calcium carbonate to precipitate from irrigation waters and to improve the appraisal of water quality predicting potential infiltration problems.

The USDAARS Laboratory has also been at the forefront of determining the boron and salt tolerance of enumerable plant species. One USDAARS Laboratory study quantified all available salt tolerance data by presenting threshold salinity values for yield decrease and linear yield decrease per unit of salinity. Thus a given crop's response to salinity can be described using only two variables, thereby simplifying the selection of an appropriate crop for waters and soils of a given salinity. Salt tolerance tables, thresholds, and yield responses are provided in all manuals and handbooks dealing with crop production on saline soils and/or with saline waters and are used world-wide.

Salt balance and leaching requirements for water used for irrigation has also been established. The salt balance is the difference between the salt input and the salt output for a given irrigation project, and is used to evaluate the adequacy of drainage facilities, leaching programs, and water requirements for removing salts, and sustaining irrigation in general. This method is still used in monitoring programs by many irrigation projects. The leaching requirement establishes the fraction of irrigation water that must be leached through the root zone to maintain an acceptable level of salinity for cropping purposes. Minimized leaching concepts developed by the USDAARS Laboratory were at the core of the water quality control measures adopted for implementation to control salinity of the Colorado River.

USDAARS Laboratory scientists have been at the forefront in developing reclamation procedures and guidelines for saline and sodic soils. To reclaim saline soils, leaching strategies especially continuous ponding and intermittent ponding were developed by Laboratory scientists and are universally used. To reclaim sodic soils, they pioneered the use of the soil amendments; gypsum, sulfuric acid, sulfur, and calcium chloride to replace exchangeable sodium along with leaching. The gypsum requirement, the amount of amendment required to affect reclamation of a given amount of exchangeable sodium, was developed at the Salinity Laboratory and is the universally-used reclamation standard.

These studies established that plants exhibit differences in salinity tolerance at various growth stages. The information allows a cyclical watering strategy where good quality water was used for growth of sensitive crops during sensitive growth stages, while saline drainage water may be used for the growth of tolerant crops or during tolerant growth stages. The U. S. Bureau of Reclamation and the California Resources Agency have adopted minimized leaching and drainage water reuse concepts to conserve water, minimize drainage volumes, and protect water quality as the heart of the San Joaquin Valley Drainage Program.

A preferred sulfurous acid pre-treatment apparatus is as follows. Although sulfur dioxide from tanks associated with a contact mixer can be used to acidify the water to be pretreated, a sulfurous acid generator, such as those produced by Harmon Systems International, LLC of Bakersfield, Calif. is preferred as they are designed to produce the $SO_2$ on demand and on an as needed basis. The $SO_2$ is immediately captured in an aqueous form as sulfurous acid ($H_2SO_3$) preventing harmful operator exposure. The sulfur dioxide is injected into the water at a pH between approximately 1.5 and approximately 3.5, depending upon the dwell time required for conditioning and disinfection. At these pH ranges, sufficient $SO_2$ is generated to condition solids for separation, and disinfection and deodorizing wastewater. It was found through testing the Harmon sulfurous acid generator can condition and treat incoming raw wastewater solids to self-agglomerate into colloidal self-adhering solids which do not adhere to surfaces The Harmon sulfurous acid generator has the advantage of generating $SO_2$, as needed, avoiding the dangers of tank storage and accidental release. However, the main advantage in passing the water directly through the sulfurous acid generator is that it creates and introduces onsite $SO_2$ without adding other compounds or materials such as when using sodium meta-bisulfite and/or potassium meta bisulfite into the system, or additional acid compounds for pH lowering. The method uses both unfiltered and filtered water as the medium to scrub and form the sulfurous acid. Consequently, the treated water volume is not affected.

In one preferred pre-treatment application, the water is fed directly through the Harmon sulfurous acid generator to create a concentrated solution of sulfurous acid ($H_2SO_3$), which immediately separates and becomes $H^+$, and $HSO_3^-$. Doing this enhances the redox process because: 1.) Sulfurous Acid will neutralize the Total Alkalinity. 2.) The resulting Bisulfite ($HSO_3^-$)/$SO_2$ will attack microorganisms within the water for disinfection. 3.) Provide a means in which dissolved oxygen can be scavenged and removed from the water to enhance chemical reduction. 4.) The resultant material will be sulfate (sol) enriched, so this material can now bond (with other constituents within the water) to form useful compounds (such as calcium sulfate) and have the potential of transforming brines in the treated water into desirable and marketable compounds, such as a calcium rich supplement added to replenish depleted soil environments found in areas of high rainfall and/or calcium deficiency).

In summary, the above method provides a redox water treatment method to produce waters suitable for various soil regions, and soil conditions.

Where complex organic or wastewaters are to be conditioned for bioreactor treatment to reduce nitrogen containing compounds, the method is adapted as follows: First, determining the water's salts, ions, molecular, and chemical composition and whether water treatment requires either oxidation or reduction, or both to enhance nitrogen removal in a bioreactor. Next, sulfur dioxide ($SO_2$) is injected into water to be treated to provide $H^+$, $SO_2$, $SO_3^=$, $HSO3^-$, dithionous acid ($H_2S_2O_4$), and other sulfur intermediate reduction products forming a sulfur dioxide treated water as discussed above.

Thus, sulfurous acid behaves either as a reducing agent or an oxidizing agent depending on the nature of the combination acted upon and the strength of the acid. Further, at a given acid concentration the reduction potential of the combination acted upon need only be varied by a relatively small amount (20 to 40 mv.) in order to change the action of sulfurous acid from a reducing agent to an oxidizing agent. An increase in acid concentration makes sulfurous acid a less powerful reducing agent, and also a more powerful oxidizing agent.

If a reducing solution is required for bioreactor water treatment, the sulfur dioxide is injected into the water without the addition of additional acid. The sulfurous acid wastewater is then pH adjusted to elevate the percentage of sulfites/bisulfites in solution for optimal bacterial activity. If an oxidizing solution is required for bioreactor treatment, the sulfur dioxide is injected with air, an oxidizing agent, such as hydrogen peroxide, ozone, ferric or ferrous compounds and the pH lowered to provide an oxidizing solution. Oxidation may also require the addition of additional acid. The type of additional acid is selected so that the cations added do not adversely affect the composition of the resultant treated water. For example, sulfurous acid is preferable to hydrochloric acid as the monovalent chlorides adversely affect the salinity of the process water when applied to soils, whereas the bivalent sulfates do not.

If both reduction and oxidation is required for water treatment, first the sulfur dioxide is added to the water to create a reducing solution and held for the dwell time for the reduction mechanisms to effectively reduce the compounds of interest. Next an oxidizing agent (such as air for ease in handling and availability) and acid are added to the sulfurous acid solution to form an oxidizing solution to oxidize the compounds of interest. The sulfurous acid treated bioreactor process waters are then pH adjusted to a level required by the end user, and to precipitate any heavy metals contained therein for filtration removal. Lime has the advantage of elevating the pH, precipitating heavy metals as metal hydroxides for filtration removal and providing calcium to adjust the sodium adsorption ratio (SAR) when required for soil treatment. Other alkaline compounds, such as ammonia, may be used when additional nitrogen nutrients are required.

With complex waters, such as wastewater, numerous other compounds and components are present. Therefore the amount of sulfurous acid and pH adjustment required must be determined in the field by trial and error as bicarbonates, and other compounds materially affect the amount of sulfur dioxide and acid required for oxidation and reduction. However, the initial estimates of the amount of sulfurous acid may be based on laboratory studies of pure solutions, such as the Noyes and Steinour studies, discussed above.

Wastewaters contain nitrogen, biological oxygen demand components (BOD), chemical oxygen demand components (COD), and total suspended solids (TSS), which are treated in a biological reactor for nutrient removal. These biological reactors may be enhanced by employing the present redox reduction method employing sulfurous acid and lime comprising:

controlling and monitoring the composition of wastewater or wastewater process streams in a bioreactor to be treated and whether the wastewater and wastewater process steams require biological nutrient removal under oxidation or reduction conditions, or both.

injecting sulfur dioxide ($SO_2$) into the wastewater to be treated to provide $H^+$, $SO_2$, $SO_3^=$, $HSO_3^-$, dithionous acid ($H_2S_2O_4$), and other sulfur intermediate reduction products forming a sulfur dioxide treated wastewater with agglomerated suspended solids and acid leached heavy metals in solution, which form either:

an oxidizing solution in the presence of oxygen and sufficient acid to insure that the electrical conductivity level of the sulfur dioxide treated wastewater is sufficient to accept electrons, or a reducing solution in the presence of minimal oxygen and no additional acid to insure the electrical conductivity level of the sulfur dioxide treated wastewater is sufficient for release of electrons from the sulfur dioxide, sulfites, bisulfites, and dithionous acid, removing the suspended solids forming an oxidizing or reducing solution filtrate, adding lime to the oxidizing or reducing solution filtrate to precipitate heavy metals as metal hydroxides, and phosphates as calcium phosphate precipitates, removing metal hydroxides and calcium phosphate precipitates forming a pH adjusted oxidizing or reducing solution to stimulate biological nutrient removal; and selectively monitoring and altering the sulfur dioxide injected wastewater to form either an oxidizing solution or reducing solution, or both in a bioreactor at the oxidation reduction potential (ORP) and dissolved oxygen (DO) level/levels required to accelerate biological removal of nitrogen compounds forming a conditioned wastewater.

This redox wastewater biological nutrient removal treatment method generally includes measuring and monitoring the ORP electrical conductivity levels of a bioreactor used for bacterial removal of nutrients from wastewater to determine if the bioreactor requires an oxidizing or reducing solution, or both. Nitrification is the oxidation of ionized ammonia ($NH_4^+$) to nitrate ($NO_3^-$) and is performed by nitrifying bacteria when the ORP of the wastewater is +100 to +350 mV.

Bioremediation denitrification is the reduction of nitrate ($NO_3^-$) to molecular nitrogen ($N_2$) and is performed by denitrifying bacteria with ORP of the wastewater is +50 to −50 mV. The exact ORP may vary based on the bioreactor conditions and often reads between −0.37 and −0.14 volt at 25° C. at 1 molal $H^+$ for denitrification.

Where the treated wastewater requires additional carbon for the denitrifying bacteria, spent lime is added.

To enhance oxidation, the redox wastewater biological nutrient removal includes injecting hydrogen peroxide, oxygen containing compounds, and ferrous compounds into the sulfur dioxide treated wastewater oxidizing solution to adjust the electrical conductivity level of the sulfur dioxide treated wastewater sufficiently to accept electrons to enhance the oxidizing solution.

Similarly, the redox wastewater biological nutrient removal treatment method adds additional acid to the sulfur dioxide treated wastewater to make a more powerful oxidizing solution where required. This additional acid for oxidation is selected to provide compatible anions consistent with the discharge needs of the end user.

The present method provides a reducing agent sufficient to reduce some common oxidants, such as chlorine to chlorides. Additional sulfites and bisulfites salts may be added to the sulfur dioxide treated wastewater reducing solution to adjust the electrical conductivity level of the sulfur dioxide treatment wastewater sufficiently to donate electrons to enhance the reducing solution.

However, if a stronger reducing solution is required for degradation of compounds, such as perchlorates, and nitrates, the aqueous reduction process is too slow. To address these difficult to remove contaminants, the sulfite/bisulfite reducing solutions are first pH elevated to less than or approximately pH 7 for nitrates, and pH 10 for perchlorates to produce higher concentrations of sulfites and bisulfites. These are then energized via UV treatment, ultrasound, electron beam, and microwave treatment to form hydrated electrons, and sulfite radical anions ($SO_3^{*-}$) in the manner described below. These energized sulfites and bisulfites have been found to reduce perchlorates, nitrates, perfluorooctanoic acid and 2,4-dichlorphenyl compounds without the need for bioremediation. In particular, nitrates are eliminated in ½ to 1 hours treatment time, where the solutions are continuously irradiated with UV.

Then, if further reduction is required, bioremediation may be employed and accelerated using these energized sulfites and bisulfites without the need for supplemental carbon electron donors, such as methanol and ethanol.

The method for increasing the reduction radicals in sulfite solutions is described more particularly in the article entitled "Advanced Reduction Processes: A New Class of Treatment Processes by Bhanu Prakash Vellanki et al, Environ Eng Sci. 2013 May; 30(5): 264-271, quoted below:

"A new class of treatment processes called advanced reduction processes (ARPs) is proposed. ARPs combine activation methods and reducing agents to form highly reactive reducing radicals that degrade oxidized contaminants. Batch screening experiments were conducted to identify effective ARPs by applying several combinations of activation methods (ultraviolet light, ultrasound, electron beam, and microwaves) and reducing agents (dithionite, sulfite, ferrous iron, and sulfide) to degradation of four target contaminants (perchlorate, nitrate, perfluorooctanoic acid, and 2,4 dichlorophenol) at three pH-levels (2.4, 7.0, and 11.2). These experiments identified the combination of sulfite activated by ultraviolet light produced by a low-pressure mercury vapor lamp (UV-L) as an effective ARP. More detailed kinetic experiments were conducted with nitrate and perchlorate as target compounds, and nitrate was found to degrade more rapidly than perchlorate. Effectiveness of the UV-L/sulfite treatment process improved with increasing pH for both perchlorate and nitrate. We present the theory behind ARPs, identify potential ARPs, demonstrate their effectiveness against a wide range of contaminants, and provide basic experimental evidence in support of the fundamental hypothesis for ARP, namely, that activation methods can be applied to reductants to form reducing radicals that degrade oxidized contaminants. This article provides an introduction to ARPs along with sufficient data to identify potentially effective ARPs and the target compounds these ARPs will be most effective in destroying. Further research will provide a detailed analysis of degradation kinetics and the mechanisms of contaminant destruction in an ARP." See *Environ Eng Sci*. 2013 May; 30(5): 264-271. "Advanced Reduction Processes: A New Class of Treatment Processes" by Bhanu Prakash Vellanki; Bill Batchelor, and Ahmed Abdel-Wahab, who further explain:

" . . . advanced reduction processes (ARPs) . . . degrades oxidized contaminants by producing highly reactive reducing radicals by combining reagents and activation methods. This mode of operation is similar to that employed by advanced oxidation processes (AOPs), but differs in that reducing radicals are produced rather than oxidizing radicals such as the hydroxyl radical.

A free radical can be defined as any species having an odd number of electrons and thus having an unpaired electron. A free radical normally has a strong tendency to either give up the unpaired electron or accept another electron to form a pair. Therefore, they act as effective reductants (donating electrons) or oxidants (accepting electrons).

In general, the kinetics of the redox reactions involved in the degradation of a target compound are the crucial factor in deciding the feasibility of a treatment process. The formation of the highly reactive reducing radicals will make the kinetics of the desired reactions feasible, when they might be too slow with typical reductants. Many radicals are not selective and are thus well-suited for use as effective reductants in water/wastewater treatment.

Many of the current water treatment techniques for contaminated water, such as ion exchange, reverse osmosis, and nanofiltration/ultrafiltration, only concentrate the contaminant without degrading or eliminating it. Employing ARPs, which make use of such highly reactive and minimally selective radicals, will lead to transformation of target contaminants into more innocuous or simpler products. Also, the partial decomposition of nonbiodegradable organic pollutants can lead to biodegradable intermediates.

Prospective reducing agents and activation methods were chosen for initial experiments testing the concept of ARPs based on their ability to either produce or promote formation of reducing radicals. The target contaminants in these experiments included organics, inorganics, and emerging contaminants."

They further explain: . . . "Ultraviolet (UV) light of a variety of wavelengths could be used in an ARP, and the desired wavelength would depend on the absorption spectra of the reagent to be activated. One type of lamp that is currently used in water and wastewater treatment is the low-pressure mercury vapor lamp (UV-L), and this lamp produces light that is almost entirely at 254 nm. Another type of lamp is a narrowband ultraviolet (UV-N) lamp that primarily emits light at 313 nm, which is more effectively absorbed by reagents such as dithionite.

When a liquid is irradiated with ultrasound, the ultrasound waves pass through the medium in a series of alternate compression and expansion cycles leading to the creation of microbubbles. The extreme conditions generated during cavitation cause thermal decomposition of water to create both oxidizing (OH*) and reducing (H*) radical species (Skov et al., 1997; Kang and Hoffmann, 1998).

In electron beam (E-beam) treatment, ionizing radiation from an electron beam source is used to pass electrons through water, producing free radicals that can degrade aqueous contaminants. (Siddiqui et al., 1996). The oxidizing free radical (OH*) and the reducing species (H* and $e^-_{aq}$) are the most reactive products of this reaction and generally control the rate of degradation observed during E-beam treatment.

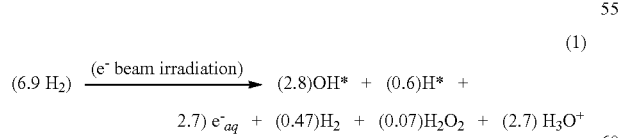

(1)

$(6.9 H_2) \xrightarrow{(e^- \text{ beam irradiation})} (2.8)OH^* + (0.6)H^* + 2.7)e^-_{aq} + (0.47)H_2 + (0.07)H_2O_2 + (2.7) H_3O^+$ The values in parenthesis are called G values and they represent the efficiency of the ionizing, radiation in producing reactive species. A G value is defined as the moles of radicals, excited species or other products, formed (or lost) due to absorption of $10^7$ J of energy. (Nickelsen et al., 1992).

Microwave energy is a nonionizing electromagnetic radiation with frequencies in the range of 300 MHz to 300 GHz. (Hague, 1999). Degradation or enhanced degradation of target compounds by these treatment processes is brought about by the rapid heating caused by microwave irradiation, by direct microwave action, or by both (Hague, 1999; Lo et al., 2010).

. . . Reducing agents. Different reductants can be chosen for ARPs based upon their ability to be activated by one or more activation methods and produce reducing radicals or effective reducing agents. Dithionite is known to have a long, weak S—S bond that can be broken to produce two sulfur dioxide radical anions ($SO_2^-$) (Makarov, 2001).

$S_2O_4^{2-} = 2SO_2^{*-}$ (2)

The sulfur dioxide radical anion exists in aqueous dithionite solutions at very low concentrations, as evidenced by the low equilibrium constant for this reaction of $1.4 \times 10^{-9}$ M (Mayhew, 1978; Neta et al., 1987). This free radical anion is a strong reductant with a reported standard reduction potential of $-0.66$ V (Mayhew, 1978). Dithionite has an absorption peak in the ultraviolet near 315 nm (Ohlsson et al., 1986; McKenna et al., 1991; Pukhovskaya et al., 2005), so irradiation near this wavelength can provide energy to break the weak S—S bond.

Although sulfite ($SO_3^{2-}$) is a particular anion, it will be used as a general term to describe the group that includes sulfurous acid ($H_2SO_3$), bisulfate ($HSO_3^-$), and sulfite ($SO_3^{2-}$). The UV absorption peak of sulfite solutions depends on the pH and concentration of the solutions (Getman, 1926). Both the hydrated electron (Devonshire and Weiss, 1968) and the sulfite radical anion ($SO_3^{*-}$) (Dogliotti and Hayon, 1968; Chawla et al., 1973; Buxton et al., 1988; Jeevarajan and Fessenden, 1989) are formed in irradiated sulfite solutions.

$SO_3^{2-} + h\nu = SO_3^{*-} + e^-_{aq}$ (3)

The hydrated electron would be a strong reductant and the sulfite radical anion could act as an oxidant or reductant, because it can accept an electron to return to sulfite or it can donate an electron and react with water to form sulfate.

Sulfide solutions absorb UV light with a maximum at 230 nm (Kotronarou et al., 1992; Dzhabiev and Tarasov, 1993; Melsheimer and Schlogl, 1997) and irradiation with UV has promoted formation of hydrogen (Dzhabiev and Tarasov, 1993; Hara et al., 1999).

Solutions of ferrous iron absorb UV light with a maximum at 220 nm and UV irradiation promotes formation of hydrogen (Potterill et al., 1936). This could occur through a reaction of hydrated electrons with hydrogen ions, because hydrated electrons have been shown to be formed in ferrous iron solutions irradiated with UV light (Airey and Dainton, 1966).

Target Contaminants

Four target compounds were investigated in this study—perchlorate, nitrate, perfluorooctanoic acid (PFOA), and 2,4-dichlorophenol (2,4-DCP). Perchlorate is a highly oxidized form of chlorine that is difficult to reduce. This is of concern as it can disturb the functioning of the thyroid gland by interfering with its iodide uptake. (ITRC Perchlorate Team, 2007). Most chemical processes that degrade perchlorate are slow and require high temperatures or high pressures, or both. Physical treatment processes like ion exchange, reverse osmosis, nanofiltration/ultrafiltration, electrodialysis, and capacitive deionization can remove perchlorate from impacted media, but they do not degrade it. Biological processes also have been employed to treat contaminated ground and surface water, soil and wetlands (Urbansky, 2002; ITRC Perchlorate Team, 2007). Biological processes can be limited by their poor performance with toxic compounds present in the water and by poor performance at extreme temperatures or ionic strength. Another potential problem is that it can be difficult to monitor the addition of electron donors (organics) to match incoming electron acceptors (perchlorate, nitrate). Furthermore, in some cases, biological treatment processes have the potential to allow growth of undesirable microorganisms such as pathogens.

Nitrate is one of the most widespread contaminants of ground water in the United States, due to its use as a fertilizer and its formation from other nitrogen forms in human and animal wastes. Nitrate adversely affects human health by causing methemoglobinemia in infants as well as inhibiting iodine uptake by the thyroid gland, leading to thyroid dysfunction (ITRC EISBD Work Team, 2000). Active metals, ammonia, borohydride, formate, hydrazine, hydroxylamine, hydrogen, and ferrous iron are some of the chemical-reducing agents that have been used to chemically reduce nitrate in the presence of catalysts, or high temperatures, and pressures. Electrochemical and photochemical techniques are some of the nitrate reduction mechanisms that employ energy sources (Fanning, 2000).

PFOA is a synthetic, completely fluorinated organic acid that does not occur naturally in the environment. The physiochemical stability of PFOA makes it difficult to treat using most conventional treatment methods (Hoffmann et al., 2009).

2,4-DCP is a chlorinated derivative of phenol, which is highly toxic to aquatic organisms. 2,4-DCP is used primarily as intermediate in the preparation of the herbicide 2,4 dichlorophenoxyacetic acid (2,4-D). It is a high-volume chemical, which is highly toxic to aquatic organisms (Exon and Koller, 1985)."

The exact reduction chemical mechanisms are complex, given the various component mixtures for wastewater. However, the following is one nitrate reduction mechanism using advanced reduction processes:

$$\text{Sulfurous Acid} + \text{Lime} = SO_3^{2-} + Ca^{2+} \quad pH \geq 7$$

$$SO_3^{2-} + h\nu = SO_3^{*-} + e^-_{aq} \quad \text{UV-L}$$

$$SO_4^{*-} + SO_3^{2-} = SO_4^{2-} + SO_3^{*-}$$

$$SO_3^{*-} + NO_3^- = SO_4^{*-} + NO_2^-$$

$$SO_4^{*-} + e^-_{aq} = SO_4^{2-}$$

$$NO_3^- + 3H^+ + 2e^- \rightleftharpoons HNO_2 + H_2O$$

$$2HNO_2 + 4H^+ + 4e^- \rightleftharpoons H_2N_2O_2 + 2H_2O$$

$$H_2N_2O_2 + 2H^+ + 2e^- \rightleftharpoons N_2\uparrow + 2H_2O$$

Vellanki et al found these energized advanced reduction solutions were found effective in reducing nitrates, perchlorates, PFOA, and 2-4-DCPs over conventional methods where most chemical processes that degrade perchlorate are slow and require high temperatures or high pressures, or both. Physical treatment processes like ion exchange, reverse osmosis, nanofiltration/ultrafiltration, electrodialysis, and capacitive deionization remove perchlorate from impacted media, but they do not degrade it. Biological processes also have been employed to treat contaminated ground and surface water, soil and wetlands. Biological processes can be limited by their poor performance with toxic compounds present in the water and by poor performance at extreme temperatures or ionic strength. Another potential problem is that it can be difficult to monitor the addition of electron donors (organics) to match incoming electron acceptors (perchlorate, nitrate). Furthermore, in some cases, biological treatment processes have the potential to allow growth of undesirable microorganisms such as pathogens.

Catalysts may be employed to speed up the reactions as discussed in "The chemical reduction of nitrate in aqueous solution" by James C. Fanning; Coordination Chemistry Reviews, 199 (2000) 159-179:

"When a 1 M $NaNO_3$:0.1 M NaOH solution is irradiated with a 500 W Xe arc lamp and a Pt—$TiO_2$ powder impregnated photocatalyst is present, nitrite forms at a rate of 2.8 mmol h_1. However, when a 1 M $HNO_3$ solution is subjected to the same conditions, 2.4 mmol h_1 of ammonia form. O2 is also formed in both instances. A photocatalytic reduction of nitrate has been carried out using $H_2TiO_4$:CdS nanocomposites in which CdS particles of less than 0.8 nm thick are incorporated into the interlayers of $H_2Ti_4O_9$. When a 1 mM $NO_3^-$ solution with methanol present is exposed to UV light from a 100 W high pressure Hg lamp, within 20 h the nitrate has completely decomposed to nitrite and ammonia. The methanol serves as a sacrificial reductant that prevents the CdS from oxidizing Kogel and Monbouquette have shown that with quantum-sized CdS nanocrystals electron redox potentials can be tuned to sufficiently negative potential to enable nitrate reduction at neutral pH."

After reduction, the treated solutions are then adjusted for land application.

pH adjustment for land application is usually accomplished by adding lime and calcium carbonate to adjust the pH and calcium ion concentration of the conditioned wastewater to provide soil concentrations with a sodium absorption ratio (SAR) less than 15, soil electrical conductivity (EC) less than 2 dS $m^{-1}$ (m mho $cm^{-1}$), cation exchange capacity (CEC) less than 57.5 centimoles/kg, and a pH less than 8; the specific soil ratios and concentration levels selected for raising a particular crop and reducing soil bicarbonates/carbonates to increase soil porosity and improve water penetration. Usually the pH is held between 2 and 6.8 for alkaline soil land application.

Where both oxidation and reduction are required for biological nutrient removal, the redox wastewater biological nutrient removal treatment method comprises:

determining and controlling the composition of wastewater or wastewater process streams to be treated in a sequential batch reactor for biological nutrient removal under both oxidation and reduction conditions, injecting sulfur dioxide ($SO_2$) and oxygen into the wastewater to be treated to provide $H^+$, $SO_2$, $SO_3^=$, $HSO_3^-$, dithionous acid ($H_2S_2O_4$), and other sulfur intermediate reduction products forming a sulfur dioxide treated wastewater with agglomerated suspended solids and acid leached heavy metals in solution under oxic or aerobic conditions where the oxidation reduction potential (ORP) and dissolved oxygen level (DO) is sufficient for the sulfur dioxide treated water to accept electrons to create an oxidizing solution for nitrification to occur for bacteria to break down ammonia into nitrite and then into nitrate compounds, stopping oxygen injection into the nitrified wastewater to form a reducing solution under anoxic anaerobic conditions where the oxidation reduction potential (ORP) is adjusted to insure that the electrical conductivity level of the sulfur dioxide treated wastewater is sufficient to donate electrons to create a reducing solution for denitrification to occur where bacteria breaks down the nitrates into nitrogen, removing the suspended solids from the denitrified solution forming a filtrate, adding lime to the filtrate to precipitate heavy metals as metal hydroxides, and phosphates as calcium phosphate precipitates, and removing metal hydroxides and calcium phosphate precipitates forming a pH adjusted recovered wastewater suitable for land application.

This redox wastewater biological nutrient removal treatment method using sulfur dioxide treated nitrified wastewater under oxic or aerobic conditions has an ORP between +50 and +300 mV for nitrifying bacteria to nitrify ammonia to form nitrites and nitrobacteria then convert the nitrite to nitrate. An ORP between +50 and −50 mV under anoxic anaerobic conditions is adjusted and held for facultative bacteria to denitrify and convert the nitrates to nitrogen gas.

If pH buffering is required, the redox wastewater biological nutrient removal treatment method usually adds spent lime to buffer the sulfur dioxide and oxygen treated nitrified wastewater under oxic conditions and provide additional carbon for denitrification to occur.

The redox water method thus provides an oxidation/reduction water treatment method for oxidizing and reducing compounds of interest in waters to be treated. When used for complex waters, such as wastewaters, the redox water treatment method enhances bioreactor removal of nitrogen compounds by reducing shock loads on them, and holding the oxidation reduction potentials at levels, which enhance nitrification and denitrification using organic sulfurous acid and lime compounds.

DESCRIPTION OF THE ILLUSTRATED EMBODIMENTS

Figure 1:
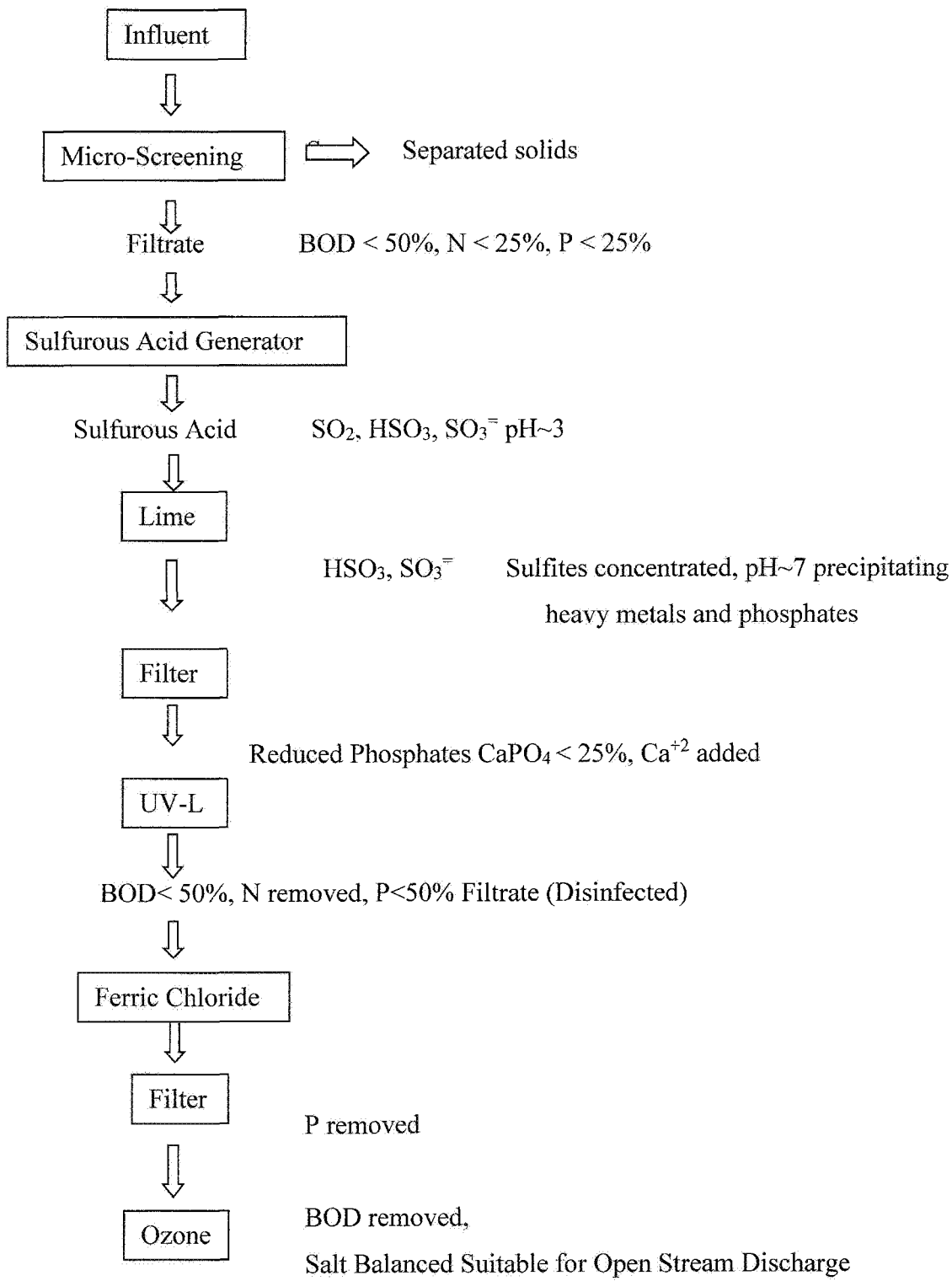
FIG. 1 illustrates an example of an influent flow scheme for wastewater treatment.

FIG. 1 illustrates an example of an influent flow scheme for wastewater treatment. The saline influent high in BOD, TSS, N, and P is micro-screened to remove separated solids; thereby reducing the filtrate BOD<50%, N<25%, and P<25%. The filtrate is passed through a sulfurous acid generator adding sulfur dioxide, sulfites and bisulfites thereto at a pH of ~3. The acid enhanced filtrate is then pH adjusted with lime to concentrate the sulfites and bisulfites at a pH of approximately 7. The calcium precipitates ~25% of the phosphates, and many heavy metals in solution, which are removed by a second filter.

This reduced phosphate, heavy metal free filtrate is then exposed to low pressure UV for ½ to 1 hour to remove the nitrates and disinfect the filtrate. If Phosphorous has to be further reduced, ferric chloride or another reagent is added and filtered to remove the phosphorous.

Lastly, if BOD's are too high, the reduced metal, nitrogen, and phosphorous filtrate is exposed to ozone to remove the BOD to provide a salt balanced, disinfected filtrate suitable for open stream discharge.

Figure 2:
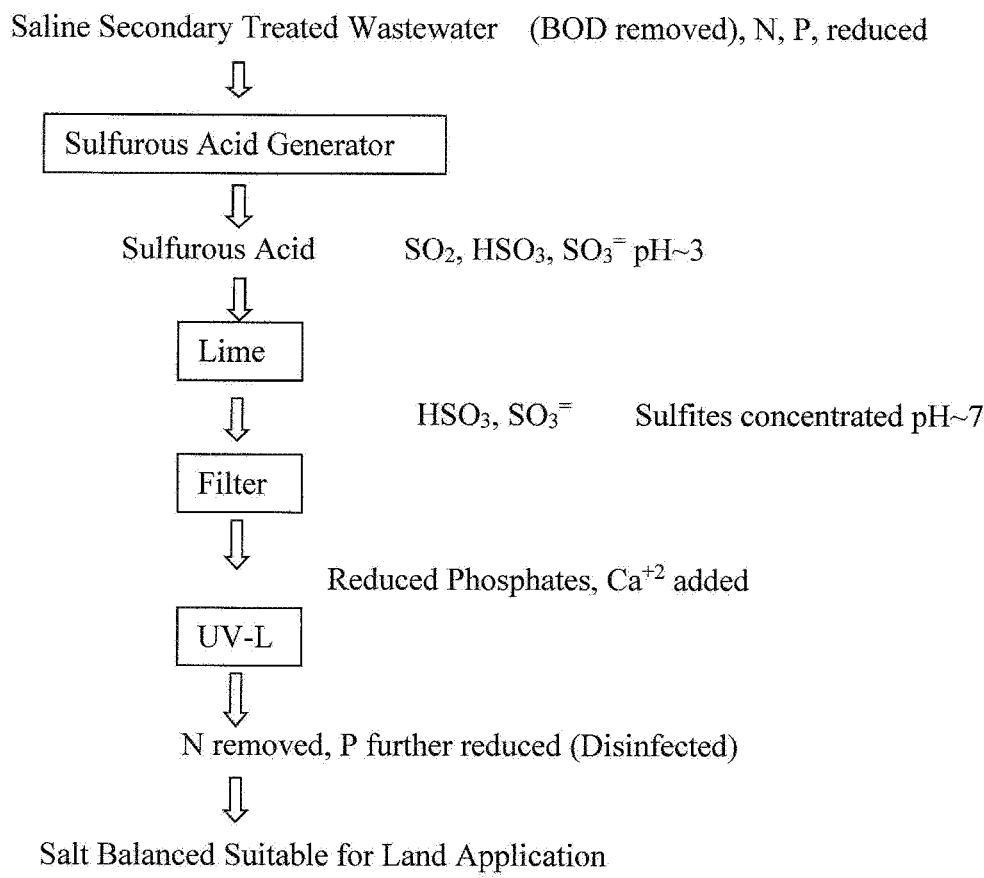
FIG. 2 illustrates an application flow scheme for wastewater disinfection and denitrification.

FIG. 2 illustrates an application flow scheme for wastewater disinfection and denitrification. Saline secondary treated wastewaters with BOD removed, and nitrogen and phosphorous reduced, is passed through a sulfurous acid generator as before to add adding sulfur dioxide, sulfites and bisulfites thereto at a pH of ~3. The acid enhanced filtrate is then pH adjusted with lime to concentrate the sulfites and bisulfites at a pH of approximately 7. The calcium precipitates ~25% of the phosphates, and many heavy metals in solution, which are removed by a second filter This reduced phosphate, heavy metal free filtrate is then exposed to low pressure UV for ½ to 1 hour to remove the nitrates and disinfect the filtrate; providing a salt balanced filtrate suitable for land application.

While the invention has been described with reference to its presently-preferred embodiment, it is not limited thereto. Rather, this invention is limited only insofar as it is defined by the following set of patent claims and includes within its scope all equivalents thereof. The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

We claim:

1. A redox water treatment method employing sulfurous acid to regulate oxidation reduction potential to precipitate, remove or degrade nitrates, perchlorates, PFOA, and other compounds slowly reduced by aqueous sulfur dioxide and one or more of the following compounds in water:
   i. heavy metals and other alkaline precipitating compounds,
   ii. phosphates and other compounds forming precipitates with calcium,
   iii. acid agglomerating suspended solids and precipitates with or without sorbed pharmaceutical, personal care products, and other polar molecules,
   iv. alkaline agglomerating suspended solids and precipitates with or without sorbed pharmaceutical, personal care products, and other polar molecules,
   v. oxidizable compounds,
   vi. reducible compounds and
   vii. pathogens,
   comprising:
   a. selecting compounds in water to be either oxidized, or reduced, for removal,
   b. injecting sulfur dioxide ($SO_2$) into the water to be treated to provide $H^+$, $SO_2$, $SO_3^{-2}$, $HSO_3^-$, dithionous acid ($H_2S_2O_4$), and other sulfur intermediate reduction products forming a sulfur dioxide treated water,
   c. adjusting the oxidation reduction potential electrical conductivity levels of the water treated with sulfur dioxide to form either an oxidizing, or reducing solution to degrade oxidizable and reducible compounds by amending the sulfur dioxide treated water with either:
      i. oxygen, air, or an oxidizing agent, and additional acid from a different source in addition to that contained in the sulfur dioxide treated water to ensure that the electrical conductivity level of the water treated with sulfur dioxide causes the sulfur dioxide to accept electrons to create an oxidizing solution to oxidize oxidizable compounds, or ii. additional sulfur dioxide with minimal oxygen and no additional acid to ensure the electrical conductivity level of the water treated with sulfur dioxide for the sulfur dioxide treated water to release of electrons to form a reducing solution to reduce reducible compounds, disinfect pathogens, acid leach heavy metals from suspended solids into solution, and self-agglomerate suspended solids, d. raising the pH of the reducing solution filtrate to approximately 7 or greater than approximately 7 to increase sulfite/bisulfite concentrations, and exposing the elevated sulfite/bisulfite reducing solution filtrate to UV light, ultrasound, electron beam, or microwave treatment to energize and produce hydrated electrons, and sulfite radical anions ($SO_3^{*-}$) to enhance reduction degradation of nitrates, perchlorates, and other compounds slowly reduced by aqueous sulfur dioxide while providing disinfection, and e. filtering the sulfur dioxide treated water oxidizing and/or reducing solutions to remove suspended solids and acid or alkaline precipitates to form either an oxidizing solution filtrate or a reducing solution filtrate.

2. A redox water treatment method according to claim 1, including:
a. disposing the suspended solids and any sorbed polar molecules from the oxidizing or reducing solution filtrates,
b. raising the pH of the reducing solution filtrate with lime, ammonia, or alkaline compounds to precipitate heavy metal hydroxides, calcium phosphates and precipitates, and
c. removing the heavy metal hydroxides and calcium phosphates and precipitates forming a disinfected demetalized filtrate suitable for land application or biological treatment.

3. A redox water treatment method according to claim 1, including injecting hydrogen peroxide or other oxygen containing compounds into the sulfur dioxide treated water oxidizing solution to ensure that the electrical conductivity level of the sulfur dioxide treated water is sufficient to accept electrons to enhance the oxidizing solution.

4. A redox water treatment method according to claim 1, including adding additional sulfites and bisulfites from sulfite/bisulfite salts in addition to those contained in the sulfur dioxide treated water.

5. A redox water treatment method according to claim 1, wherein the electrical conductivity is between −0.37 and −0.14 volt at 25° C. at 1 molal $H^+$.

6. A redox water treatment method according to claim 1, wherein the additional acid is selected so that cations added do not adversely affect resultant treated water.

7. A redox water treatment method according to claim 1, including adding a catalyst to the reducing solution to speed degradation.

8. A redox water treatment method employing sulfurous acid to regulate oxidation reduction potential to precipitate, remove or degrade nitrates, perchlorates, PFOA, and other compounds slowly reduced by aqueous sulfur dioxide and one or more of the following compounds in water:

i. heavy metals and other alkaline precipitating compounds,
ii. phosphates and other compounds forming precipitates with calcium,
iii. acid agglomerating suspended solids and precipitates with or without sorbed pharmaceutical, personal care products, and other polar molecules,
iv. alkaline agglomerating suspended solids and precipitates with or without sorbed pharmaceutical, personal care products, and other polar molecules,
v. oxidizable compounds,
vi. reducible compounds and
vii. pathogens, comprising:
a. selecting which ionic and molecular components in water are to be treated with either oxidation or reduction,
b. injecting sulfur dioxide ($SO_2$) into the water to provide $H^+$, $SO_2$, $SO_3^{=2}$, $HSO3^-$, dithionous acid ($H_2S_2O_4$), and other sulfur intermediate reduction products forming a sulfur dioxide treated water,
c. adjusting the sulfur dioxide treated water to form a reducing solution by adding more sulfur dioxide to ensure the electrical conductivity level of the sulfur dioxide treated water is sufficient for release of electrons from the sulfur dioxide, sulfites, bisulfites, and dithionous acid to form a reducing solution to reduce ionic and molecular compound oxidants, disinfect pathogens, acid leach heavy metals from suspended solids into solution, and self-agglomerate suspended solids and acid precipitates,
d. removing suspended solids and acid precipitates with any sorbed polar molecules from the reducing solution to produce a reducing solution filtrate containing heavy metals,
e. exposing the reducing solution filtrate containing nitrates to UV reduction to form hydrated electrons and enhance sulfur dioxide, sulfites, bisulfites, and dithionous acid radical ions ($SO_3^{*-}$) for enhanced reduction and/or disinfection,
f. injecting oxygen and additional acid into the reducing solution filtrate to insure that the electrical conductivity of the sulfur dioxide treated water accepts electrons to create an oxidizing solution,
g. raising the pH of the oxidizing solution with lime to precipitate heavy metals as metal hydroxides, calcium phosphates and alkaline precipitates, and
h. removing the metal hydroxides, calcium phosphates and alkaline precipitates to form a disinfected demetalized filtrate suitable for raising crops and biological treatment.

9. A redox water treatment method according to claim 8, wherein lime and/or calcium carbonate is added to raise the pH and calcium ion concentration of the filtrate to provide soil concentrations with a sodium adsorption ratio SAR less than 15, electrical conductivity EC less than 2 dS m$^{-1}$ (m mho cm$^1$), cation exchange capacity CEC less than 57.5 centimoles/kg, and a pH less than 8.

10. A redox water treatment method according to claim 9, wherein the pH of the demetalized filtrate is between 2 and 6.8 for land application to alkaline soils.

11. A redox water treatment method according to claim 10, wherein the filtrate sulfurous acid has a free $SO_2$ and bisulfite ($HSO_3^-$) concentration, a pH level, and a dwell time sufficient to affect disinfection before land application.

12. A redox water treatment method according to claim 8, wherein the oxidizing solution is first raised to a pH level of up to 11 to precipitate heavy metals as metal hydroxides for removal, and the resultant demetalized filtrate is then pH lowered for raising plants and biological treatment, and providing a soil sodium adsorption ratio SAR level suitable for plant propagation and reduce soil carbonates/bicarbonates to improve water penetration.

13. A redox water treatment method employing sulfurous acid to regulate oxidation reduction potential for wastewater containing nitrates, perchlorates, PFOA, and other compounds slowly reduced by aqueous sulfur dioxide, nitrogen compounds, total suspended solids (TSS), biological oxygen demand compounds (BOD), chemical oxygen demand compounds (COD) undergoing biological nitrogen reduction in a bioreactor, comprising:

a. controlling and monitoring the composition of wastewater or wastewater process streams entering the bioreactor to be treated and whether the wastewater and wastewater process streams require biological nutrient removal under either oxidation or reduction conditions,
   b. injecting sulfur dioxide ($SO_2$) into the wastewater or wastewater process streams to provide $H^+$, $SO_2$, $SO_3^=$, $HSO_3^-$, dithionous acid ($H_2S_2O_4$), and other sulfur intermediate reduction products forming a sulfur dioxide treated wastewater with agglomerated suspended solids and acid leached heavy metals in solution,
   c. adjusting the injected sulfur dioxide to form either an oxidizing, or reducing solution by amending the sulfur dioxide treated water by adding:
      i. oxygen and sufficient acid to insure that the electrical conductivity level of the sulfur dioxide treated water is sufficient to accept electrons to create an oxidizing solution, or
      ii. additional sulfur dioxide with minimal oxygen and no additional acid to insure the electrical conductivity level of the sulfur dioxide treated water is sufficient for release of electrons to form a reducing solution,
   d. removing suspended solids from the oxidizing and/or reducing solutions forming either an oxidizing solution filtrate or reducing solution filtrate,
   e. exposing the reducing solution filtrate to UV light at a pH less than or equal to 7 for nitrate reduction of the reducing solution filtrate, or pH 10 for perchlorate reduction of the reducing solution filtrate to form hydrated electrons and enhance sulfur dioxide, sulfites, bisulfites, and dithionous acid radical ions ($SO_3^{*-}$) for enhanced reduction of nitrates, perchlorates, and other compounds slowly reduced by aqueous sulfur dioxide and/or disinfection,
   f. adding lime to the oxidizing or reducing solution filtrate to precipitate heavy metals as metal hydroxides, and phosphates as calcium phosphate precipitates,
   g. removing metal hydroxides and calcium phosphate precipitates from the oxidizing or reduction solution filtrate forming a pH adjusted oxidizing or reducing solution second filtrate and transferring the second filtrate to the bioreactor; and
   h. adjusting the oxidation reduction potential (ORP) of the second filtrate by injecting, into the second filtrate additional sulfur dioxide conditioned in the manner of steps 14c to form either an oxidizing solution or reducing solution, in a bioreactor at the oxidation reduction potential (ORP) and dissolved oxygen (DO) level/levels required to stimulate and accelerate biological removal of nitrogen compounds forming a conditioned wastewater.

14. A redox water treatment method according to claim 13, wherein the ORP electrical conductivity is adjusted and held at an mV required for nitrification.

15. A redox water treatment method according to claim 13, wherein after nitrification, the ORP electrical conductivity is adjusted and held at an mV required for denitrification.

16. A redox water treatment method according to claim 13, wherein the second filtrate is treated under oxic or aerobic conditions at an ORP between +50 and +300 mV for nitrification, and an ORP between +50 and −50 mV under anoxic anaerobic conditions for denitrification.

17. A redox water treatment method according to claim 13, wherein the lime added is spent lime, which adds additional carbon for denitrifying bacteria.

18. A redox water treatment method according to claim 13, including injecting hydrogen peroxide, oxygen containing compounds, and ferrous compounds into the second filtrate to adjust the electrical conductivity level sufficiently to accept electrons to enhance the oxidizing solution.

19. A redox water treatment method according to claim 18, including adding additional acid to the second filtrate to make a more powerful oxidizing solution.

20. A redox water treatment method according to claim 19, wherein the additional acid for oxidation is selected to provide cations consistent with discharge end use.

21. A redox water treatment method according to claim 13, including adding additional sulfites and bisulfites from salts to the second filtrate to adjust the electrical conductivity level of the sulfur dioxide sufficiently to donate electrons to enhance reduction.

22. A redox water treatment method according to claim 1, including adding lime and calcium carbonate to adjust the pH and calcium ion concentration of the water to be treated for land application to provide soil concentrations of sodium absorption ratio (SAR) less than 15, soil electrical conductivity (EC) less than 2 dS m$^{-1}$ (m mho cm$^{-1}$), cation exchange capacity (CEC) less than 57.5 centimoles/kg, and a pH less than 8; the specific soil ratios and concentration levels selected for raising a particular crop and reducing soil bicarbonates/carbonates to increase soil porosity and improve water penetration.

23. A redox water treatment method according to claim 22, wherein the concentration of sulfurous acid of the water to be treated has a pH between 2 and 6.8 for alkaline soil land application.

* * * * *